June 18, 1929.  A. G. REDMOND  1,717,625
CARBURETOR
Filed May 26, 1922
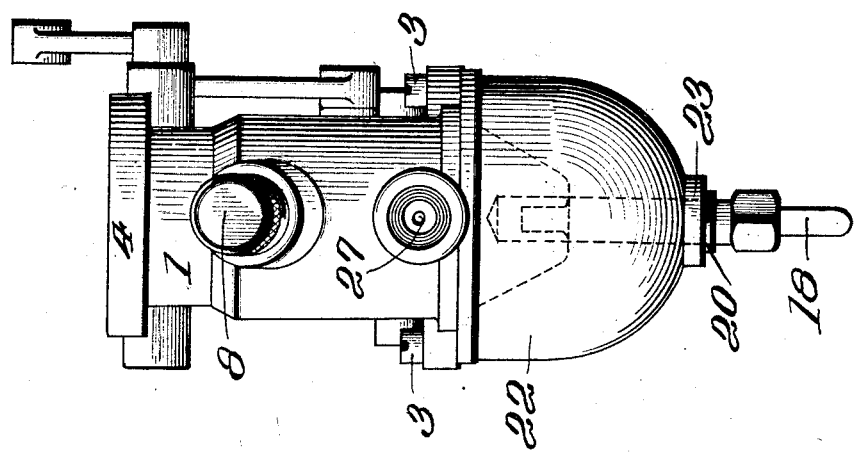
Inventor
A. G. REDMOND.
By
Attorney Patented June 18, 1929.

1,717,625

UNITED STATES PATENT OFFICE.

ALBERT G. REDMOND, OF FLINT, MICHIGAN, ASSIGNOR TO JACOB RICHARD FRANCIS, OF FLINT, MICHIGAN.

CARBURETOR.

Application filed May 26, 1922. Serial No. 563,821.

This invention relates to certain new and useful improvements in carburetors, and more particularly to that class of carburetors in which high and low speed nozzles are employed in connection with a pivoted suction controlled valve, the object being to improve the general construction by forming the carburetor of an upper and lower section detachably connected together in order to allow the sections to be removed for repairing the parts.

Another and further object of the invention is to provide a carburetor in which the working or movable parts of the carburetor are mounted in the upper section and the nozzles in the lower section whereby the parts of the carburetor are accessible when the two sections are removed to facilitate the repairing of the parts.

Another and further objects of the invention is to provide the lower section with a partition with an opening separating the low speed air passage from the high speed air passage, the construction of the same being such that an opening is formed by drilling into the partition from beneath so as to form an air passage for the low speed nozzle.

Other and further objects and advantages of the invention will be hereinafter set forth and the novel features thereof defined by the appended claims.

In the drawings,

Figure 1 is a vertical section through my improved construction of carburetor; and Figure 2 is an elevation of the same.

In constructing a carburetor in accordance with my invention I employ an upper section 1 and a lower section 2 which are secured together by a pair of screws 3 in order to allow the sections to be readily connected or taken apart.

The upper section is provided with a flange 4 forming means for connecting the same to the intake manifold of an internal combustion engine. A mixing chamber 5 is formed in the upper section in which is pivotally mounted a suction controlled valve 6 held in closed position by a spring 7 the tension of which may be adjusted through the medium of an adjusting screw 8, said valve being mounted on a stem 9 and provided with a tail portion 10, as clearly shown, for the purpose hereinafter fully described. A main air inlet 11 is provided in the upper section having a choker valve 12 mounted therein.

The lower section 2 is provided with a central depression forming a chamber 13 having a transversely arranged partition 14 provided with an opening, the partition being arranged adjacent the tail 11 of the suction controlled valve as clearly shown. The partition is provided with an opening 15 of a predetermined size formed by drilling from beneath in order to form a low speed air passage, the drill being forced upwardly through the vertical opening 16 formed in the lower section in which is arranged the low speed nozzle 17 which is provided with a needle valve 18 for controlling the flow of the fuel therethrough.

Extending upwardly from the lower section is a high speed nozzle 19 which terminates adjacent the end of the suction controlled valve 6. The lower end of the lower section is threaded as shown at 20 and is provided with a shoulder 21 against which a cup shaped bowl 22 is secured by a nut 23 forming a fuel and float chamber 24. The high and low speed nozzle are in communication with the fuel chamber 24 and pivotally mounted within the chamber is a float 25 which is adapted to engage the needle valve 26 for controlling the inlet 27 which is formed integral with the lower section 2, as clearly shown, whereby the fuel is maintained at a predetermined level in the usual manner.

The float 25 is carried by a hinged member 28 which engages the needle valve 26 so as to control the supply of fuel to the bowl in a novel manner.

In practice I preferably construct the tubular upper section of cast iron which increases the life of the same and provides better wearing qualities for the working parts of the carburetor and the lower section can be formed of either cast iron or brass and the bowl is preferably formed of brass.

By constructing the carburetor in this manner all of the working parts of the carburetor are carried by the upper section and the fuel nozzles and bowl are carried by the lower section and so connected to the upper section that when the two sections are separated, the parts can be readily assembled.

From the foregoing description it will be seen that I have provided a carburetor formed of two sections detachably connected together in such a manner that they can be readily assembled or taken apart for repairing the parts, the upper section being provided with a mixing chamber and the lower section with fuel nozzles, one of which extends into the upper section and the other into a main fuel air passage which is formed in a partition by a drill from beneath whereby the carburetor can be manufactured very cheaply.

What I claim is:—

1. A carburetor comprising two sections detachably connected together, the upper section being provided with a mixing chamber and a suction controlled valve and the lower section with a low and high speed nozzle, said lower section being provided with a partition having an opening into which the low speed nozzle extends.

2. A carburetor formed of two sections detachably connected together, one section being provided with a mixing chamber and a suction controlled valve, said suction controlled valve being provided with a tail portion, the other section being provided with a chamber separated by a partition arranged adjacent the tail of said suction controlled valve, said partition being provided with an opening, a main fuel nozzle extending into said opening and a high speed nozzle extending from said lower section into the upper section and terminating adjacent the free end of said valve.

3. A carburetor formed of an upper section and a lower section detachably connected together, said upper section being provided with an air inlet, mixing chamber and means for connecting the same to the intake of an internal combustion engine, a suction controlled valve mounted in said upper section having a tail portion, the lower section being provided with a chamber divided by a partition having an opening, the partition being arranged adjacent the tail of said suction controlled valve, a fuel bowl surrounding said lower section, fuel nozzles extending from said fuel bowl, one of said nozzles extending into said opening and the other nozzle extending into the upper section and terminating adjacent said suction controlled valve.

4. A carburetor formed of an upper and lower section detachably connected together, the upper section being tubular in form and having means at its upper end for connecting the same to an internal combustion engine and provided at its lower end with an air inlet, a pivoted suction controlled valve mounted in said upper section having a tail portion, the lower section being provided with a chamber separated by a partition arranged adjacent the tail of said suction controlled valve, said partition being provided with an opening, a fuel bowl surrounding said lower section, a low speed nozzle extending into said chamber beneath the opening of said partition and a high speed nozzle carried by the lower section extending into the upper section and terminating adjacent said suction controlled valve.

5. A carburetor having a mixing chamber provided with a suction controlled valve, an air inlet to said carburetor, a partition in said carburetor having an opening forming a low speed air passage around said valve, a low speed nozzle arranged beneath the opening of said partition and a high speed nozzle arranged adjacent said suction controlled valve and terminating adjacent the free end thereof.

6. A carburetor formed of two sections detachably connected together, the upper section being provided with means for connecting the same to the intake manifold of an internal combustion engine and the lower section being provided with a fuel bowl, a suction controlled valve mounted in the upper section and having a tail portion, a partition formed in the lower section having an opening, said partition being arranged adjacent the tail portion of said suction controlled valve, a low speed nozzle arranged in the opening of said partition and a high speed nozzle carried by the said lower section extending into the upper section and terminating adjacent said suction controlled valve.

In testimony whereof I hereunto affix my signature.

ALBERT G. REDMOND.